(12) United States Patent
Rossi et al.

(10) Patent No.: US 10,542,767 B2
(45) Date of Patent: Jan. 28, 2020

(54) PASTA WITH A NOVEL FORM

(71) Applicant: Barilla G. e R. Fratelli S.p.A., Parma (IT)

(72) Inventors: Stefano Rossi, Montechiarugolo (IT); Manuel Mariani, San Lazzaro di Savena (IT); Italo Bardiani, Parma (IT)

(73) Assignee: BARILLA G. E R. FRATELLI S.P.A., Parma (IT)

( * ) Notice: Subject to any disclaimer, the term of this patent is extended or adjusted under 35 U.S.C. 154(b) by 57 days.

(21) Appl. No.: 15/492,637

(22) Filed: Apr. 20, 2017

(65) Prior Publication Data

US 2017/0325487 A1    Nov. 16, 2017

(30) Foreign Application Priority Data

May 10, 2016  (IT) .................. 102016000048003

(51) Int. Cl.
  *A23L 7/109*  (2016.01)
  *A23P 30/20*  (2016.01)

(52) U.S. Cl.
  CPC ............. *A23L 7/109* (2016.08); *A23P 30/20* (2016.08); *A23V 2002/00* (2013.01)

(58) Field of Classification Search
  CPC .................................. A23P 30/20; A23L 7/109
  See application file for complete search history.

(56) References Cited

U.S. PATENT DOCUMENTS

| | | | |
|---|---|---|---|
| 2,062,338 A | 12/1936 | Tanzi | |
| 5,728,418 A | 3/1998 | Hauser et al. | |
| 2002/0192339 A1* | 12/2002 | Hauser | A23L 7/109 426/143 |
| 2012/0040078 A1* | 2/2012 | Narwankar | A23L 7/13 426/618 |

OTHER PUBLICATIONS

"The Geometry of Pasta". Available online from www.geometryofpasta.co.uk as of Nov. 3, 2014. pp. 1-29. (Year: 2014).*
Blonz, "How to Buy Pasta". Available online as of Aug. 13, 2013 from www.berkeleywellness.com. pp. 1-4. (Year: 2013).*
Bilow, "Make a Better Baked Pasta With These Can't-Ignore Tips". Available online as of Mar. 6, 2015 from www.bonappetit.com. pp. 1-5. (Year: 2015).*
"Italian Short Pasta Shapes". Available online of Dec. 22, 2012 of www.clovegarden.com. pp. 1-26. (Year: 2012).*
"Pasta Shapes Dictionary". Available online from http://pastafits.org as of Apr. 6, 2015. pp. 1-9. (Year: 2015).*

(Continued)

*Primary Examiner* — Jenna A Watts
(74) *Attorney, Agent, or Firm* — Lucas & Mercanti, LLP

(57) ABSTRACT

Dried pasta in the form of a tortiglione, i.e. shaped as a hollow cylindrical tube, having an outer diameter of between 8 and 14 mm and having on its outer surface a plurality of ridges or ribs oriented in the manner of a helix with an angle of inclination of between 40° and 58°; these tortiglioni have organoleptic and structural characteristics, in particular a consistency or texture, superior to those of conventional tortiglioni which have ridges or ribs oriented in the manner of a helix with an angle of inclination of about 35°.

12 Claims, 4 Drawing Sheets

(56) References Cited

OTHER PUBLICATIONS

"Tortiglioni N. 83", MINTEL, 2016, XP002764426, Database accession No. 3753901, 3 Pages.
"Tortiglioni Pasta", MINTEL, 2015, XP002764427, Database accession No. 3432797, 3 Pages.
"Tortiglioni. The Geometry of Pasta", MINTEL, 2016, XP002764428, Database accession No. 3905807, 3 Pages.
Italian Search Report for corresponding Italian Application No. IT UA20163318 ( dated Nov. 21, 2016) (2 Pages).

\* cited by examiner

Prior Art

PASTA WITH A NOVEL FORM

CROSS-REFERENCE TO RELATED APPLICATIONS

This application claims the benefit of Italian Patent Application No. 102016000048003 filed May 10, 2016, the contents of which are incorporated herein by reference.

FIELD OF THE INVENTION

According to its more general aspect, the present invention relates to the sector of the food industry.

In particular, the invention relates to a form of pasta having organoleptic and structural characteristics which are improved compared to the form of conventional pasta from which it has been developed.

BACKGROUND OF THE INVENTION

One of the forms of pasta most popular with consumers—known for a long time—is that of a so-called "tortiglione", which may be regarded as being a variant of macaroni, differing from the latter in that it has ridges with a helical rather than longitudinal orientation as in the case of macaroni.

The attached FIG. 1 shows a tortiglione of the conventional type and the aforementioned helical orientation of the ridges is clearly visible.

Tortiglione is a type of pasta which is popular because of its particular and marked consistency when tasted and is particularly suitable also for the preparation of pasta dishes in an oven, because of its particular firmness when cooked.

One object of the present invention is to provide a novel type of tortiglione, which may have consistency characteristics which are further improved compared to a conventional tortiglione, without modifying the ingredients from which the pasta is produced.

SUMMARY OF THE INVENTION

Such an object has been achieved by modifying the ridges of the tortiglione and in particular modifying the inclination of the aforementioned ridges with respect to the longitudinal axis of the tortiglione, thus providing a dried pasta in the form of a tortiglione, i.e. shaped as a hollow cylindrical tube, having an outer diameter of between 8 and 14 mm and having on its outer surface a plurality of ridges or ribs oriented in the manner of a helix with an angle of inclination of between 40° and 58°.

Preferably, the aforementioned angle of inclination is between 45° and 55°, and conveniently between 45° and 50°.

Preferably on the outer surface of the aforementioned hollow cylindrical tube there are 10-14—conveniently 12—ridges or ribs.

Preferably on the outer surface of the aforementioned hollow cylindrical tube there are 10-14—conveniently 12—grooves.

"Grooves" is understood as meaning the depressions present on the outer surface of the aforementioned hollow cylindrical tube, while "ridges" or "ribs" is understood as meaning the raised lines present on this surface, these generally consisting of a number equal to that of the grooves.

The thickness of the aforementioned hollow cylindrical tube, measured at the deepest point of the grooves, is preferably between 0.8 and 1.2 mm.

The thickness of the aforementioned hollow cylindrical tube, measured at the highest point of the ridges, is preferably between 1.3 and 1.7 mm.

The length of the aforementioned hollow cylindrical tube varies preferably from 35 to 55 mm.

The tortiglioni according to the present invention may be produced from substantially bran-free durum wheat semolina as well as from whole wheat semolina or semolina with a medium-bran content.

It has been surprisingly found that, by increasing the angle of inclination of the helix defined by each ridge or rib on the cylindrical outer surface of the tortiglione from the 35° of tortiglioni which are currently commercially available to 40°-58°, significant improvements in the organoleptic and structural characteristics of the tortiglioni were obtained, for the same composition of the starting pasta and process parameters used during production of the pasta.

DETAILED DESCRIPTION

Figure 1:
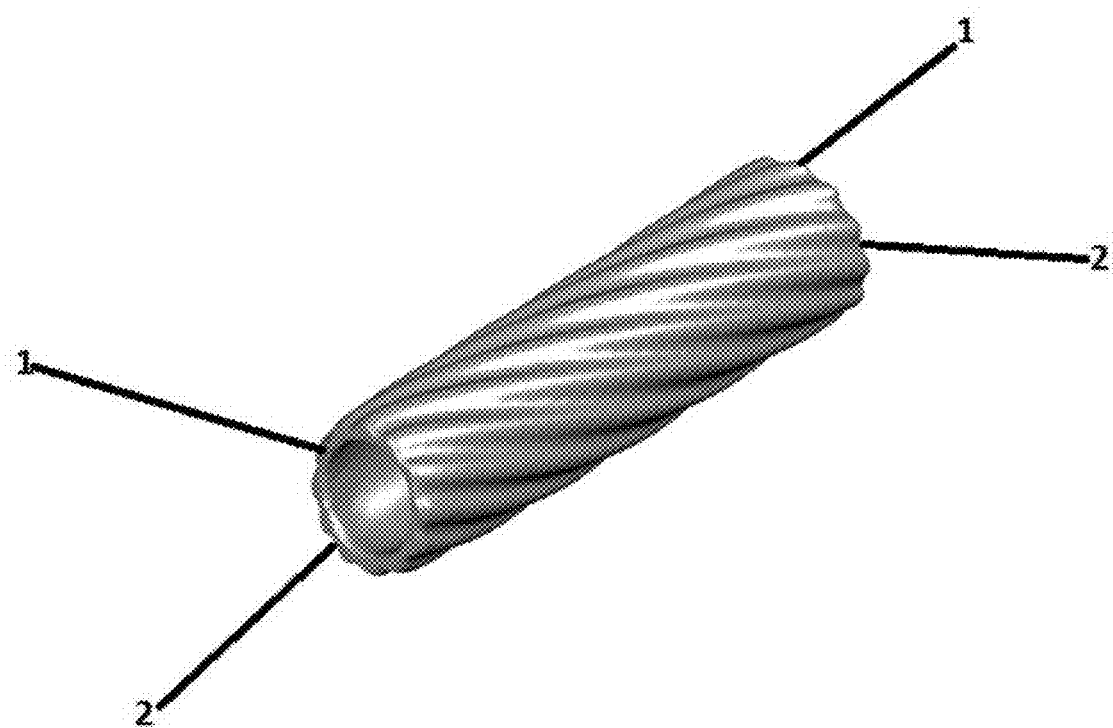
FIG. 1 shows a perspective view of a tortiglione according to the prior art, in which the ridges are arranged in the manner of a helix with an angle of inclination of 35°.
Figure 4:
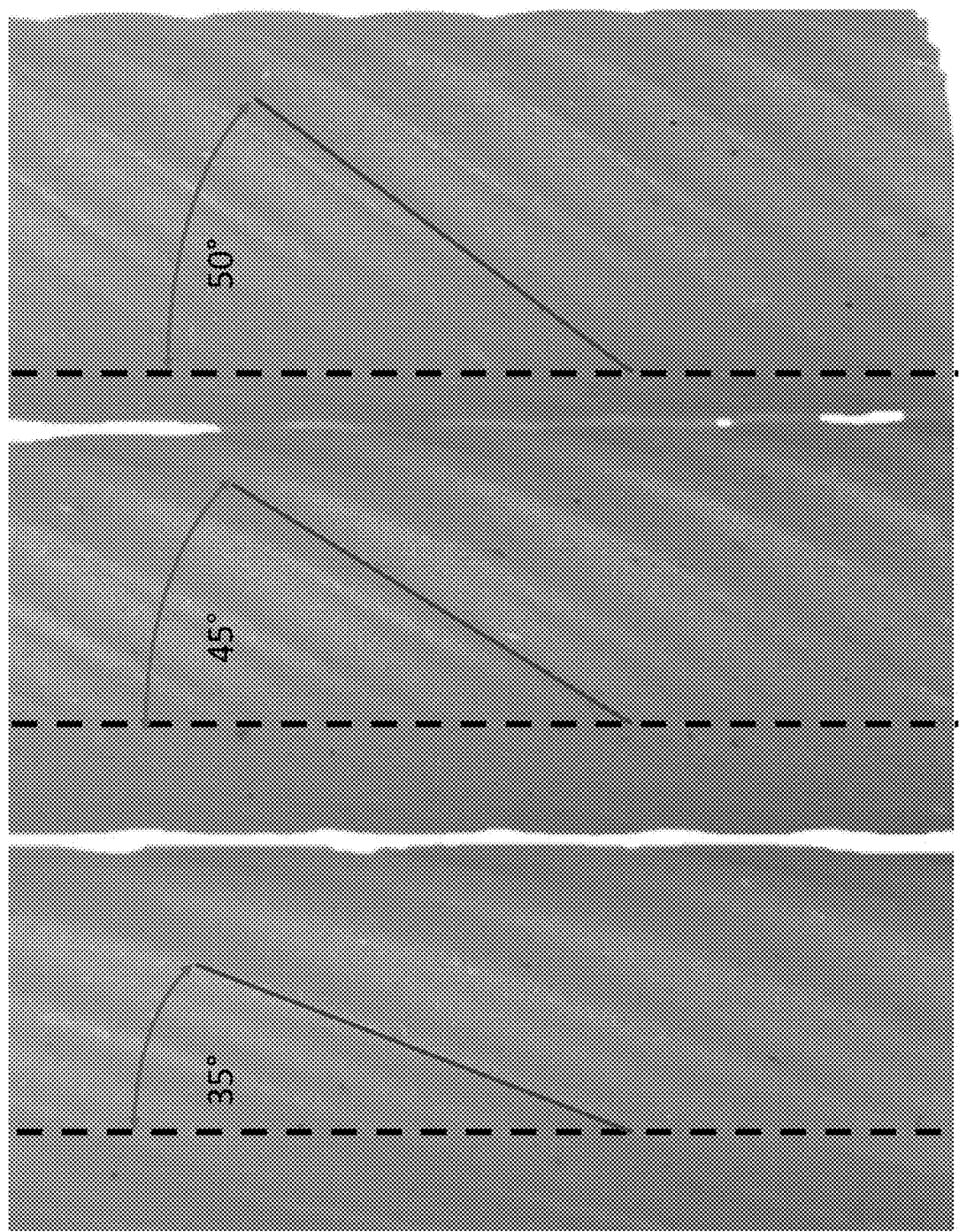
FIG. 4 shows, in a side-by-side arrangement, from left to right, partial side views of a tortiglione according to the prior art, in which the ridges are arranged in the manner of a helix with an angle of inclination of 35°, a tortiglione according to the present invention in which the ridges are arranged in the manner of a helix with an angle of inclination of 45°, and a tortiglione according to the present invention in which the ridges are arranged in the manner of a helix with an angle of inclination of 50°.

FIG. 1 shows a perspective view of an example of a commercially available tortiglione which is in the form of a hollow cylindrical tube and has on its outer surface twelve ridges 1 and a corresponding number of grooves 2 arranged in the manner of a helix with an angle of inclination of 35°, as shown in greater detail in FIG. 4 (left-hand side view).

Figure 2:
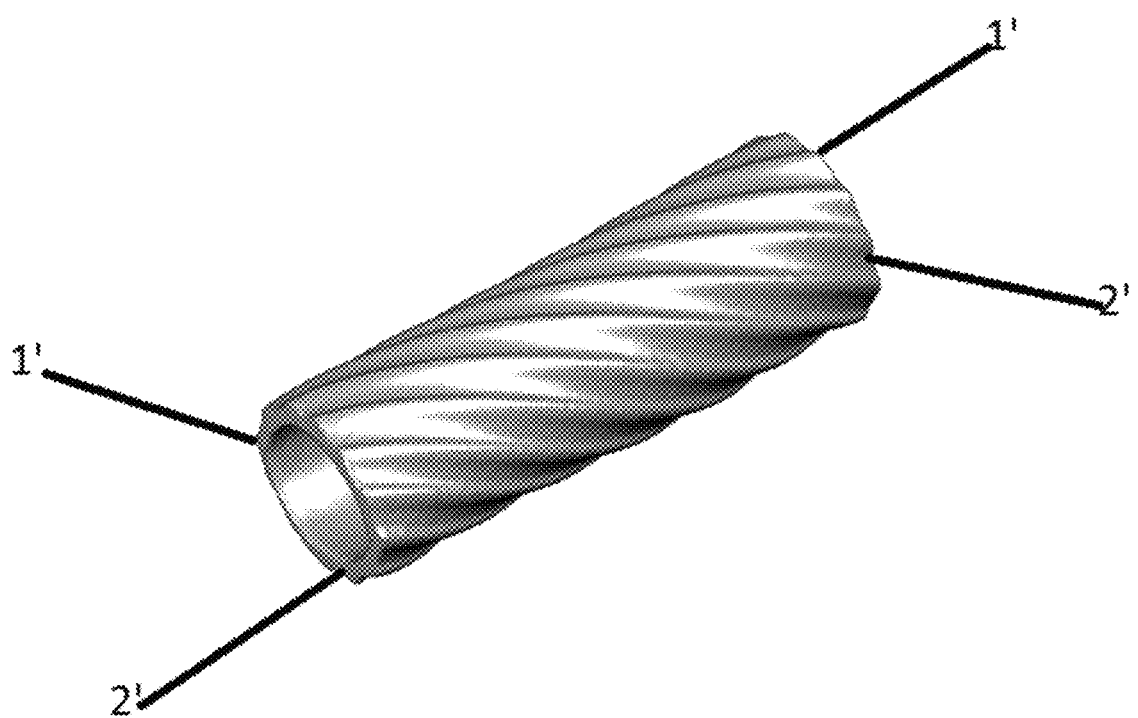
FIG. 2 shows a perspective view of a tortiglione according to the invention, in which the ridges are arranged in the manner of a helix with an angle of inclination of 45°.

FIG. 2 shows a perspective view of an example of a tortiglione according to the present invention which is also in the form of a hollow cylindrical tube and has on its outer surface twelve ridges 1' and a corresponding number of grooves 2' arranged in the manner of a helix with an angle of inclination of 45°, as shown in greater detail in FIG. 4 (central side view).

Figure 3:
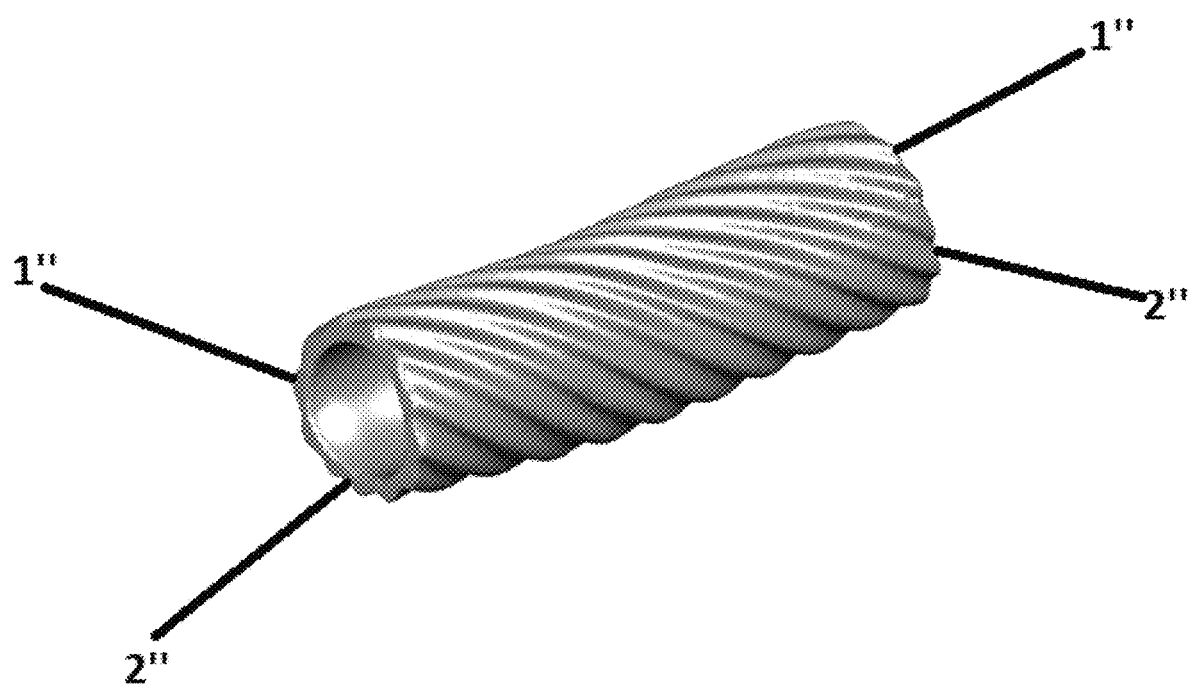
FIG. 3 shows a perspective view of a tortiglione according to the invention, in which the ridges are arranged in the manner of a helix with an angle of inclination of 50°.

FIG. 3 shows a perspective view of an example of a tortiglione according to the present invention which is in the form of a hollow cylindrical tube and which has on its outer surface twelve ridges 1" and a corresponding number of grooves 2" arranged in the manner of a helix with an angle of inclination of 50°, as shown in greater detail in FIG. 4 (right-hand side view).

As mentioned above, it has been surprisingly found that, by increasing the angle of inclination of the helix defined by each ridge on the cylindrical outer surface of the tortiglione from the 35° of the tortiglioni which are currently commercially available to 42°-58° a significant improvement in the organoleptic and structural characteristics of the tortiglioni were obtained, for the same composition of the starting pasta and process parameters used during production of the pasta.

A number of tests carried out on the two examples of embodiment of the invention according to FIGS. 2 and 3, compared with a standard commercially available tortiglione, will be provided hereinbelow by way of a non-limiting example.

EXAMPLE 1

Evaluation of the Consistency Using Instruments

The consistency following cooking of the tortiglioni according to the present invention was compared with that of a standard commercially available tortiglione (Barilla No. 83, which has helical ridges with an angle of inclination of 35°) by means of an OTMS system (Ottawa Texture Measuring System), as per Canadian Institute of Food Technology Journal, Volume 4, Ed. 4, October 1971, Page 189, using a Z3 dynamometer (marketed by Elis Srl).

The consistency or texture of the tortiglioni was measured by cooking the pasta for a predetermined period of time using an automatic cooker included in the OTMS System, which then performs automatic straining of the cooked pasta. The latter, in a carefully weighed amount, is fed to the extruder of the Ottawa unit. The OTMS system will then measure the work necessary for extruding the cooked pasta through the extruder, automatically calculating the extrusion energy in Joules, i.e. the area underneath the "displacement vs. force" curve, and will give the value of the work adjusted in relation to the weight of the pasta and expressed for 100 grammes (J/100 g cooked pasta).

Using the method described above the consistency of two examples of tortiglioni according to the present invention, namely those described above with reference to FIGS. 2 and 3, was then measured and compared with that of commercially available tortiglioni (Barilla No. 83) referred to here as "standard".

The results of this comparison are summarized in the following Table 1.

TABLE 1

| Tortiglione | Angle of inclination | Protein content (N × 5.70 dm) | Cooling time (minutes) | Thickness (mm) | Consistency (J/100 g) |
|---|---|---|---|---|---|
| Standard | 35° | 13.4% | 12 | 1.0 | 10.5 |
| FIG. 2 | 45° | 13.4% | 12 | 1.0 | 12.3 |
| FIG. 3 | 50° | 13.4% | 12 | 1.0 | 12.9 |

It is clear from the results shown in Table 1 that, for the same protein content and thickness of the pasta, the increase in the angle of inclination of the helix defined by the ridges gives rise to a significant and entirely unexpected increase in the consistency of the tortiglione compared to standard tortiglione, following cooking in the same conditions.

EXAMPLE 2

Organoleptic Evaluation

The test results obtained with the instruments described above were subsequently confirmed by organoleptic evaluation tests carried out on a sample of 603 consumers who were asked to taste the three types of tortiglione according to Example 1, without being told beforehand whether they were tasting the standard tortiglioni or the tortiglioni according to FIG. 2 or 3 of the present invention.

The consumers were then asked to taste the tortiglioni served firstly only with extra virgin olive oil and then with a tomato sauce.

The consumers were then asked to give a vote from 1 to 9 (1 representing the lowest vote and 9 the highest vote) for a series of characteristics or attributes of the cooked tortiglioni.

The following Table 2 summarizes the evaluations expressed by the consumers.

TABLE 2

|  | Tortiglione acc. to FIG. 2 Average vote | Tortiglione acc. to FIG. 3 Average vote | Standard tortiglione Average vote |
|---|---|---|---|
| Firmness after cooking | 8.0 | 7.6 | 7.5 |
| Consistency when tasted | 7.9 | 7.8 | 7.6 |
| Thickness-fullness-body | 7.9 | 7.8 | 7.5 |
| Consistency with sauce | 8.0 | 7.9 | 7.8 |

As can be noted from Table 2, the tortiglioni according to the present invention, i.e. both those according to FIG. 2 (with helical ridges at an angle of inclination of 45°) and those according to FIG. 3 (with helical ridges at an angle of inclination of 50°) achieved significantly higher votes than those of the standard tortiglioni (with helical ridges at an angle of inclination of 35°) for all the organoleptic and structural parameters which were evaluated.

The invention claimed is:

1. A dried pasta in the form of a tortiglione, said dried pasta comprising:
   a hollow cylindrical tube produced from semolina, said tube having an outer diameter of between 8 and 14 mm and having a plurality of ridges on its outer surface, said ridges being oriented in the manner of a helix with an angle of inclination of between 45° and 58°.

2. The pasta according to claim 1, wherein said angle of inclination is between 45° and 55°.

3. The pasta according to claim 1, wherein said angle of inclination is between 45° and 50°.

4. The pasta according to claim 1, wherein said hollow cylindrical tube has 10-14 ridges on its outer surface.

5. The pasta according to claim 4, wherein said hollow cylindrical tube has 10-14 grooves on its outer surface.

6. The pasta according to claim 5, wherein said hollow cylindrical tube has 12 ridges and 12 grooves on its outer surface.

7. The pasta according to claim 5, wherein the thickness of said hollow cylindrical tube, measured at the deepest point of said grooves, is between 0.8 and 1.2 mm.

8. The pasta according to claim 7, wherein the thickness of said hollow cylindrical tube, measured at the highest point of said ridges is between 1.3 and 1.7 mm.

9. The pasta according to claim 1, wherein the length of said hollow cylindrical tube varies from 35 to 50 mm.

10. The pasta according to claim 1, wherein the semolina is durum wheat semolina that is substantially bran-free.

11. The pasta according to claim 1, wherein the semolina is whole durum wheat semolina.

12. The pasta according to claim 1, wherein said pasta exhibits improved organoleptic and structural characteristics when cooked over conventional tortiglione having a same composition as said pasta.

\* \* \* \* \*